(12) United States Patent
Doerr et al.

(10) Patent No.: US 10,168,476 B2
(45) Date of Patent: Jan. 1, 2019

(54) CLADDING DEFINED TRANSMISSION GRATING

(71) Applicant: Acacia Communications, Inc., Maynard, MA (US)

(72) Inventors: Christopher Doerr, Middleton, NJ (US); Diedrik Vermeulen, Somerville, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/359,275

(22) Filed: Nov. 22, 2016

(65) Prior Publication Data

US 2017/0123154 A1    May 4, 2017

Related U.S. Application Data

(63) Continuation of application No. 13/928,031, filed on Jun. 26, 2013, now Pat. No. 9,529,156.

(60) Provisional application No. 61/664,614, filed on Jun. 26, 2012.

(51) Int. Cl.
| | | |
|---|---|---|
| *G02B 6/124* | (2006.01) | |
| *G02B 6/34* | (2006.01) | |
| *G02B 6/126* | (2006.01) | |
| *G02B 6/30* | (2006.01) | |
| *G02B 6/12* | (2006.01) | |

(52) U.S. Cl.
CPC ............ *G02B 6/124* (2013.01); *G02B 6/126* (2013.01); *G02B 6/34* (2013.01); *G02B 6/30* (2013.01); *G02B 2006/12038* (2013.01); *G02B 2006/12061* (2013.01)

(58) Field of Classification Search
CPC .................................. G02B 6/124; G02B 6/34
See application file for complete search history.

(56) References Cited

U.S. PATENT DOCUMENTS

| | | | |
|---|---|---|---|
| 6,885,804 B2 | 4/2005 | Park et al. | |
| 7,065,272 B2 | 6/2006 | Taillaert et al. | |
| 7,079,742 B1 | 7/2006 | Gunn, III et al. | |
| 8,396,334 B2* | 3/2013 | Ichikawa | G02B 6/125 385/1 |
| 8,422,841 B1 | 4/2013 | Shi et al. | |
| 2002/0150337 A1 | 10/2002 | Fujimaki | |
| 2002/0176463 A1 | 11/2002 | Bullington et al. | |
| 2002/0192850 A1* | 12/2002 | Stoltz | G02B 6/124 438/22 |
| 2005/0135739 A1* | 6/2005 | Kim | B82Y 20/00 385/28 |
| 2005/0152635 A1 | 7/2005 | Paddon et al. | |

(Continued)

OTHER PUBLICATIONS

Doerr et al., Monolithic Polarization and Phase Diversity Coherent Receiver in Silicon. J Lightwave Tech. Feb. 2, 2010;28(4):520-5.

(Continued)

*Primary Examiner* — Sung H Pak
(74) *Attorney, Agent, or Firm* — Wolf, Greenfield & Sacks, P.C.

(57) ABSTRACT

Disclosed herein are techniques, methods, structures and apparatus for providing photonic structures and integrated circuits with optical gratings disposed within cladding layer(s) of those structures and circuits.

20 Claims, 16 Drawing Sheets

(56) References Cited

U.S. PATENT DOCUMENTS

2012/0155805 A1* 6/2012 Doerr ................. G02B 6/29323
  385/37
2012/0155806 A1   6/2012 Doerr et al.
2012/0250007 A1* 10/2012 Na ......................... G01M 11/00
  356/73.1
2013/0343705 A1  12/2013 Doerr et al.

OTHER PUBLICATIONS

Doerr et al., Wide bandwidth silicon nitride grating coupler. Photon Tech Lett IEEE. Oct. 1, 2010;22(19):1461-3.
Mekis et al., Two-dimensional photonic crystal couplers for unidirectional light output. Opt Lett. Jul. 2000;25(13):942-4.
Shoji et al., Low loss mode size converter from 0.3μm square Si waveguides to singlemode fibres. Electron Lett. Dec. 5, 2002;38(25):1669-70.
Taillaert et al., A compact two-dimensional grating coupler used as a polarization splitter. IEEE Photon Tech Lett. Sep. 2003;15(9):1249-51.
Taillaert et al., An out-of-plane grating couple for efficient butt-coupling between compact planar waveguides and single-mode fibers. IEEE J Quantum Electron. Jul. 2002;38(7):949-55.

* cited by examiner

CLADDING DEFINED TRANSMISSION GRATING

CROSS REFERENCE TO RELATED APPLICATIONS

This application is a continuation claiming the benefit under 35 U.S.C. § 120 of U.S. patent application Ser. No. 13/928,031, filed Jun. 26, 2013 and entitled "CLADDING DEFINED TRANSMISSION GRATING," which is hereby incorporated herein by reference in its entirety. U.S. patent application Ser. No. 13/928,031 claims the benefit of United States Provisional Patent Application Ser. No. 61/664,614 filed Jun. 26, 2012 which is incorporated by reference in its entirety as if set forth at length herein.

TECHNICAL FIELD

This disclosure relates generally to the field of optical communications and in particular to techniques, methods and apparatus for optically coupling an optical fiber to a photonic integrated circuit.

BACKGROUND

Contemporary optical communications and other systems oftentimes require the optical coupling of an optical fiber to a photonic integrated circuit (PIC). Such optical coupling is oftentimes difficult due—in part-to the spot-size difference between the optical fiber mode(s) and a waveguide integrated within the PIC. Particularly difficult are those configurations involving a high index contrast platform such as Silicon-on-Insulator (SOI).

Accordingly, methods, structures or techniques that facilitate the optical coupling of optical fiber to a PIC would represent a welcome addition to the art.

SUMMARY

An advance in the art is made according to an aspect of the present disclosure directed to techniques, methods and apparatus for optically coupling optical waveguides and optical structures through the effect of cladding defined gratings. In an exemplary embodiment according to the present disclosure, such cladding defined structures include a core region, a cladding region adjacent to that core region, and an optical grating defined in that cladding region. In particular embodiments, multiple gratings of different types may be defined in different layers of the cladding region.

BRIEF DESCRIPTION OF THE DRAWING

A more complete understanding of the present disclosure may be realized by reference to the accompanying drawings in which:

FIG. 8 shows a schematic cross-sectional view of a photonic waveguide including a waveguide core layer between a stack of cladding layers including multiple transmission gratings according to an aspect of the present disclosure;

FIG. 9 shows a schematic cross-sectional view of a photonic waveguide including a waveguide core layer between a stack of cladding layers including multiple transmission gratings that are shifted relative to one another according to an aspect of the present disclosure;

DETAILED DESCRIPTION

Figure 1:
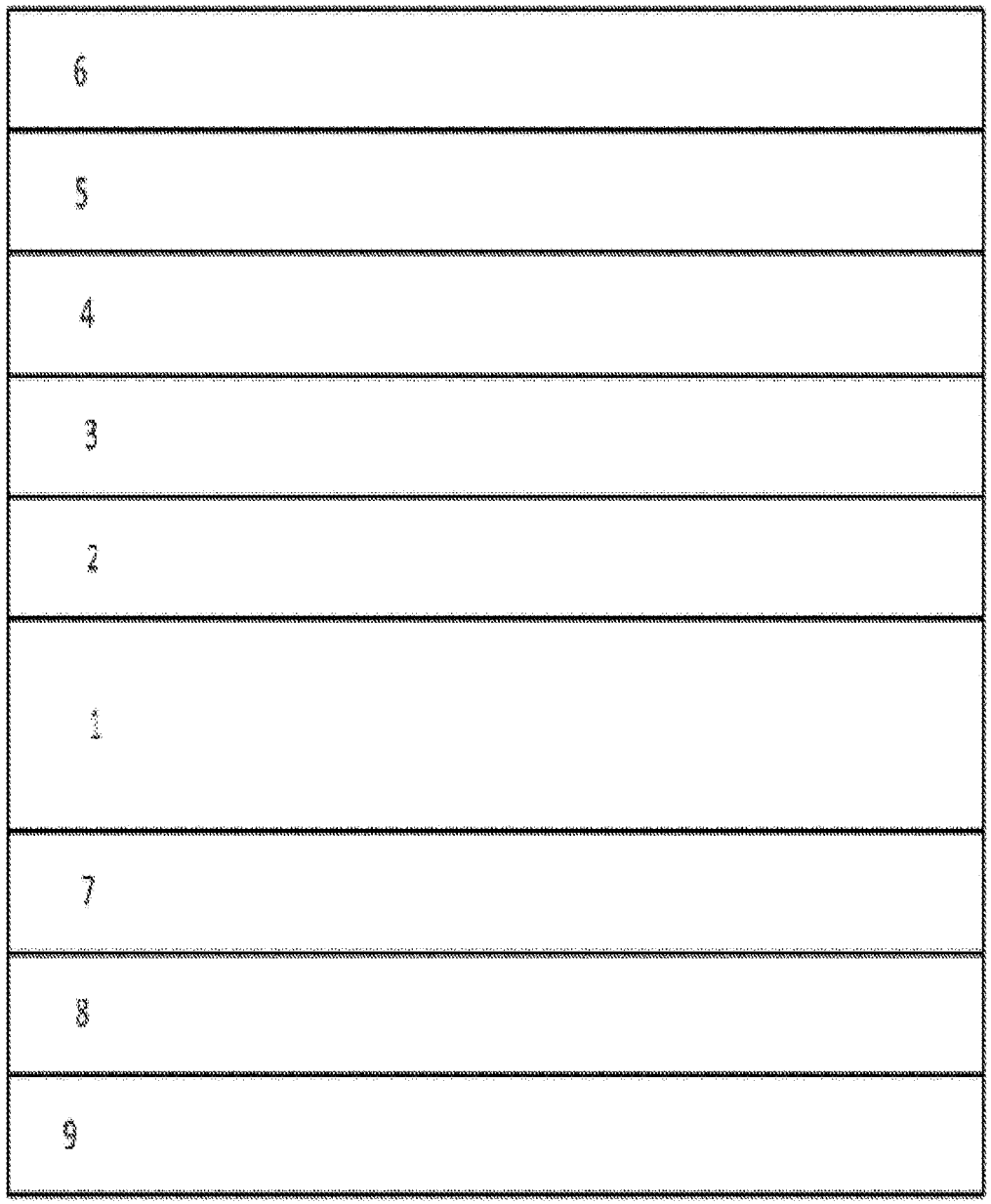
FIG. 1 shows a schematic cross-sectional view of a photonic waveguide including a waveguide core layer sandwiched between a stack of cladding layers.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

A number of definitions are useful to facilitate one's understanding of the disclosure.

Effective refractive index of the optical mode: the phase change per unit length of the optical mode divided by the wave number in vacuum.

Effective wavelength: the wavelength in vacuum divided by the effective refractive index of the optical mode.

Core region: the stack of layers where the outer layers have a refractive index higher than the effective refractive index of the optical mode and where a substantial part of the energy of the mode is located.

Cladding region: the stack of layers surrounding the core region and having a refractive index lower than the effective refractive index of the optical mode A Layer: a layer which has the same refractive index locally in the vertical dimension.

Effective refractive index of a layer: the weighted refractive index of a layer over an area of at least one effective wavelength squared.

First order diffraction: the first order diffraction of grating as known by somebody skilled in the art of grating designs.

Transmission grating: also called a binary phase grating: a periodic structure where the transmitted light experiences a different optical path length thus introducing a phase shift between the light exiting the grating at different positions.

With these definitions in place, and by way of some additional background, we note as before that coupling light from an optical fiber into a chip containing an integrated photonic circuit is a non-trivial exercise due—in part—to spot-size difference(s) between the optical fiber mode and an integrated waveguide can be very large. Especially in those configurations involving high index contrast platforms such as Silicon-on-Insulator (SOI), highly efficient coupling is a daunting task.

One known solution is to employ a horizontal spot-size convertor at the edge of the chip (See, e.g., T. Shoji, T. Tsuchizawa, T. Watanabe, K. Yamada, and H. Morita, "Low loss mode size converter from 0.3 µm square Si waveguides to singlemode fibres," *Electronics Letters*, vol. 38, no. 25, p. 1669, 2002). This approach—while very efficient—is unfortunately quite elaborate since it requires wafer dicing and sometimes facet polishing. Additionally with this approach, the number of coupling sections is limited by the circumference of the chip.

An alternative coupling solution shown in the art is one described as out-of-plane coupling. (See, e.g., D. Taillaert et al., "An out-of-plane grating coupler for efficient butt-coupling between compact planar waveguides and single-mode fibers," *IEEE Journal of Quantum Electronics*, vol. 38, no. 7, pp. 949-955, July 2002. Out-of-plane coupling enables optical wafer probing in a manner similar to electrical wafer probing.

With out-of-plane coupling techniques, an out-of-plane coupler is a periodically diffractive structure formed into a waveguide core and diffracts light out of the chip into the substrate and superstrate. Since out-of-plane coupling is a type of diffraction based coupling, it is inherently narrow-band and polarization dependent.

Consequently common problem for out-of-plane grating couplers is that the light is diffracted to multiple diffraction orders of the grating thereby limiting the coupling efficiency. Particularly for those situations exhibiting perfect vertical coupling, the second order reflection introduces a large loss factor.

However, by exciting the grating from both sides, the second order reflection can be compensated by the transmission of the light in the other direction (See, e.g., C. R. Doerr et al., "Monolithic Polarization and Phase Diversity Coherent Receiver in Silicon," *Journal of Lightwave Technology*, vol. 28, no. 4, pp. 520-525, February 2010. Such "bi-directional" couplers have an added advantage of having a better mode overlap with respect to a uniform grating coupler excited from only one side.

Those skilled in the art will appreciate that a polarization splitting grating coupler is oftentimes used to couple to a near-vertical fiber for both polarizations (See, e.g., A Mekis, A. Dodabalapur, R. E. Slusher, and J. D. Joannopoulos, "Two-dimensional photonic crystal couplers for unidirectional light output.," *Optics letters*, vol. 25, no. 13, pp. 942-4, July 2000.; D. Taillaert, P. I. Borel, L. H. Frandsen, R. M. De La Rue, and R. Baets, "A compact two-dimensional grating coupler used as a polarization splitter," *IEEE Photonics Technology Letters*, vol. 15, no. 9, pp. 1249-1251, September 2003). With such polarization splitting couplers however, the electrical field of one of the orthogonal fiber polarizations is not in-plane therefore polarization dependent loss (PDL) is introduced.

As may be appreciated, a bi-directional, perfectly vertical coupler is better suited for a 2-dimensional polarization splitting grating coupler. More specifically, when using a perfectly vertical fiber and a bi-directional polarization splitting grating coupler, the symmetry of the fiber is preserved and no PDL is introduced by the coupling section.

With respect to a 2D polarization splitting grating coupler in SOI with a Si core layer of 220 nm and a central wavelength of 1550 nm, such structure typically has a 1 dB bandwidth on the order of 25 nm and a coupling efficiency of around 25%.

According to an aspect of the present disclosure, a grating coupler is disclosed that advantageously improves the 1 dB bandwidth to 45 nm thereby easily covering the whole C-band while increasing the coupling efficiency to 80% for both polarizations. Of further advantage, a grating coupler according to the present disclosure considerably increases the tolerance to process variations while simplifying the fabrication process flow.

According to an aspect of the present disclosure, the position of a grating coupler is changed from the core layer to the cladding layer. As a result, instead of etching a grating into a core waveguide layer, the grating is etched it the cladding layer. As a result the part of the optical waveguide mode that interacts with the grating so constructed is the evanescent field instead of the core field.

As will become readily apparent, our approach to grating coupler construction according to the present disclosure has numerous advantageous. More specifically when a grating is etched into a waveguide core or is in very close proximity to the waveguide core, any change in the grating such as the etch depth, will influence both the grating strength and effective refractive index of the optical mode. In sharp contrast and according to the present disclosure, by positioning a grating far enough from the waveguide core layer, the grating itself will impart minimal influence on the waveguide mode and thus on the effective refractive index of the mode.

Importantly, and according to an aspect of the present disclosure, the strength of a grating is not determined by the etch depth but by the optical confinement of the waveguide mode. By controlling the core layer thickness, the amount of light in the evanescent field can be controlled and thereby limit the grating strength.

According to the present disclosure, vertical dimensions of the grating have minimal influence on the spectral response of the grating coupler (besides the grating directionality) and therefore one can optimize the thickness in such a way that the grating also acts as a transmission grating which only favors the first order diffraction in the superstrate. This characteristic advantageously enables coupling efficiencies of 80% in the case of a perfectly vertical bi-directional polarization splitting grating coupler. Furthermore, the optimal Si core layer thickness is 150 nm which is considerably lower than the typical 220 nm. This reduces the effective refractive index of the waveguide mode under the grating and increases the 1 dB-bandwidth of the grating coupler up to 45 nm. (See., e.g., C. R. Doerr, L. Chen, Y. K. Chen, and L. L. Buhl, "Wide bandwidth silicon nitride grating coupler," *Photonics Technology Letters, IEEE*, vol. 22, no. 19, pp. 1461-1463, 2010)

As may be further appreciated, integrated photonic waveguides require gratings for all kinds of photonic functionalities. In a typical situation, one is interested in the diffraction of the light according to a certain order of the grating.

For example a Bragg reflector grating diffracts the light according the first order of the grating obtaining a phase match with the backwards travelling optical mode in the waveguide. Other exemplary functionalities include grating couplers wherein the diffracted light is phase matched to a plane wave in the top or bottom cladding, achieving out-of-plane coupling. This can be used to couple to, for example, an optical fiber, laser or photodetector.

Typically one defines the grating in the optical core region of the waveguide as explained in the Definitions section. According to the present disclosure however, we deliberately define the grating in a cladding layer and use it as a transmission grating in order to favor a certain diffraction order and achieve highly efficient coupling. One particular embodiment according to the present disclosure is one wherein the transmission grating is only defined in the top cladding or in the bottom cladding in order to favor the upwards or the downwards diffraction order respectively.

With reference now to FIG. 1, there it shows a schematic cross-sectional view of a photonic waveguide including a waveguide core layer (1) sandwiched or otherwise positioned or formed between a stack of cladding layers (2-9) as one may find in the current art.

Figure 2:
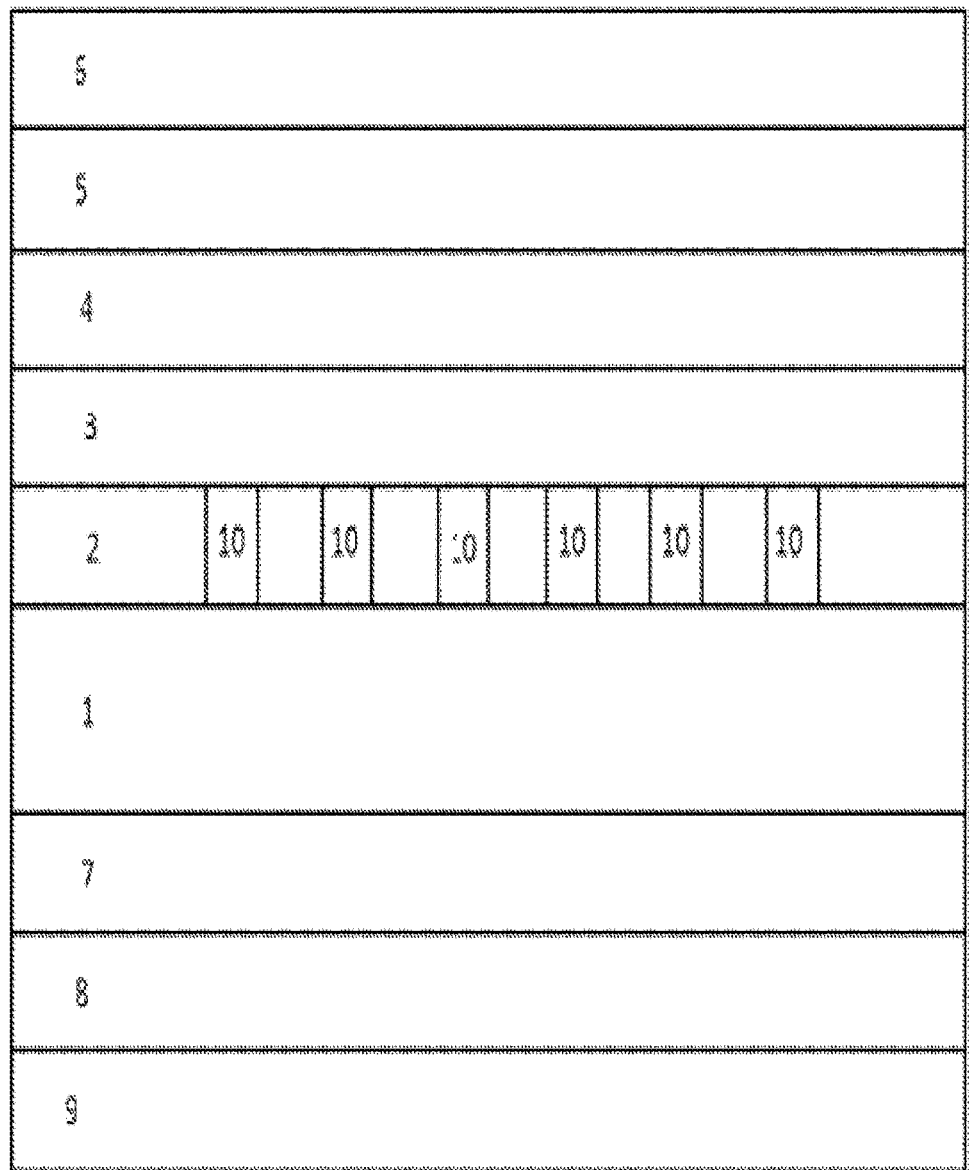
FIG. 2 shows a schematic cross-sectional view of a photonic waveguide including a waveguide core layer between a stack of cladding layers including a phase grating within a cladding layer according to an aspect of the present disclosure.

FIG. 2 shows a schematic cross-sectional view of a photonic waveguide including a waveguide core layer (1) positioned between a stack of cladding layers (2-9) including a phase grating (10) according to an aspect of the present disclosure. As may be observed from this FIG. 2, the grating (10) is formed within cladding layer 2.

Figure 3:
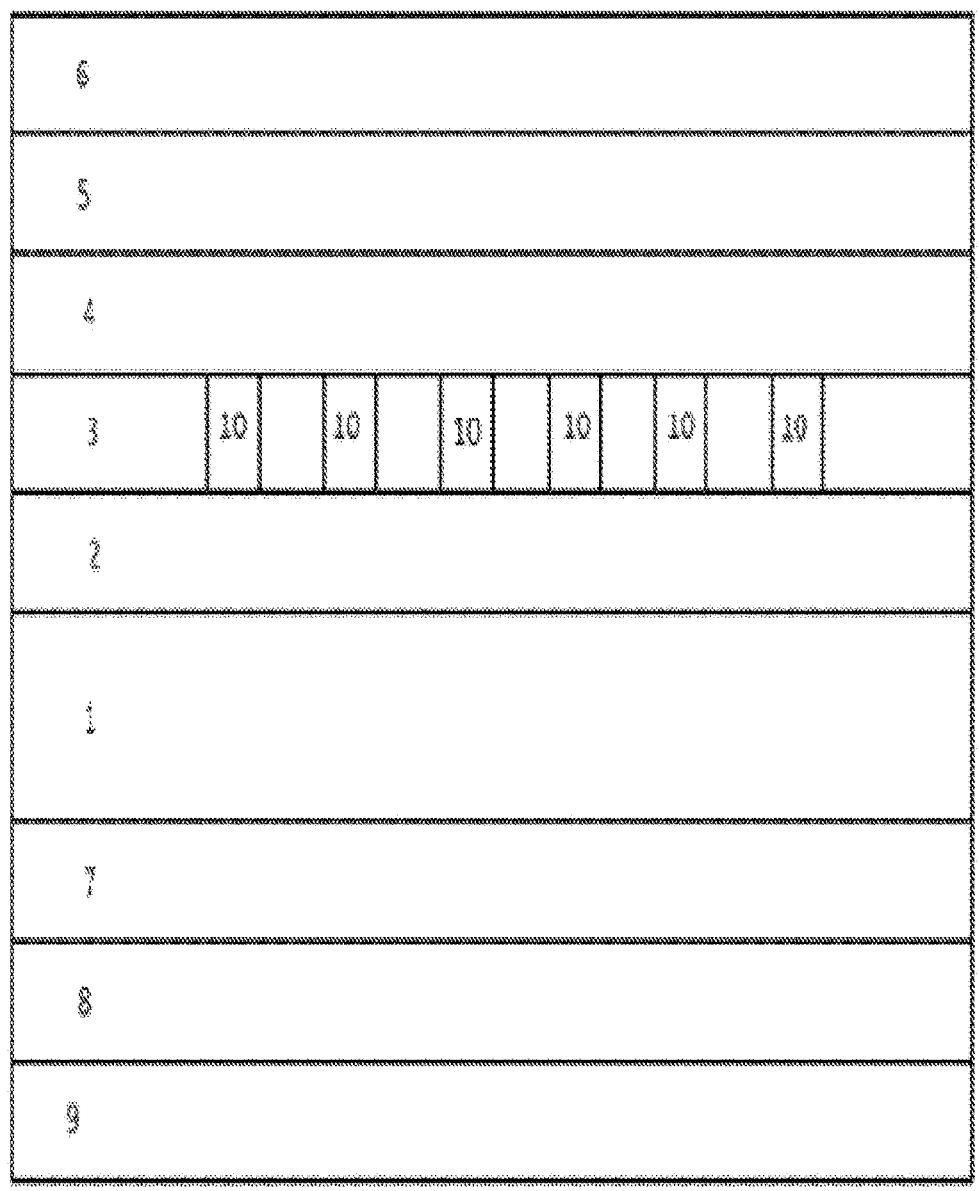
FIG. 3 shows a schematic cross-sectional view of a photonic waveguide including a waveguide core layer sandwiched between a stack of cladding layers including a transmission grating formed within a cladding layer according to an aspect of the present disclosure.

Similarly, FIG. 3 shows a schematic cross-sectional view of a photonic waveguide including a waveguide core layer (1) positioned between a stack of cladding layers (2-9) including a transmission grating (10) according to yet another aspect of the present disclosure. As may be observed from this FIG. 3, the grating (10) is formed within cladding layer 3.

Figure 4:
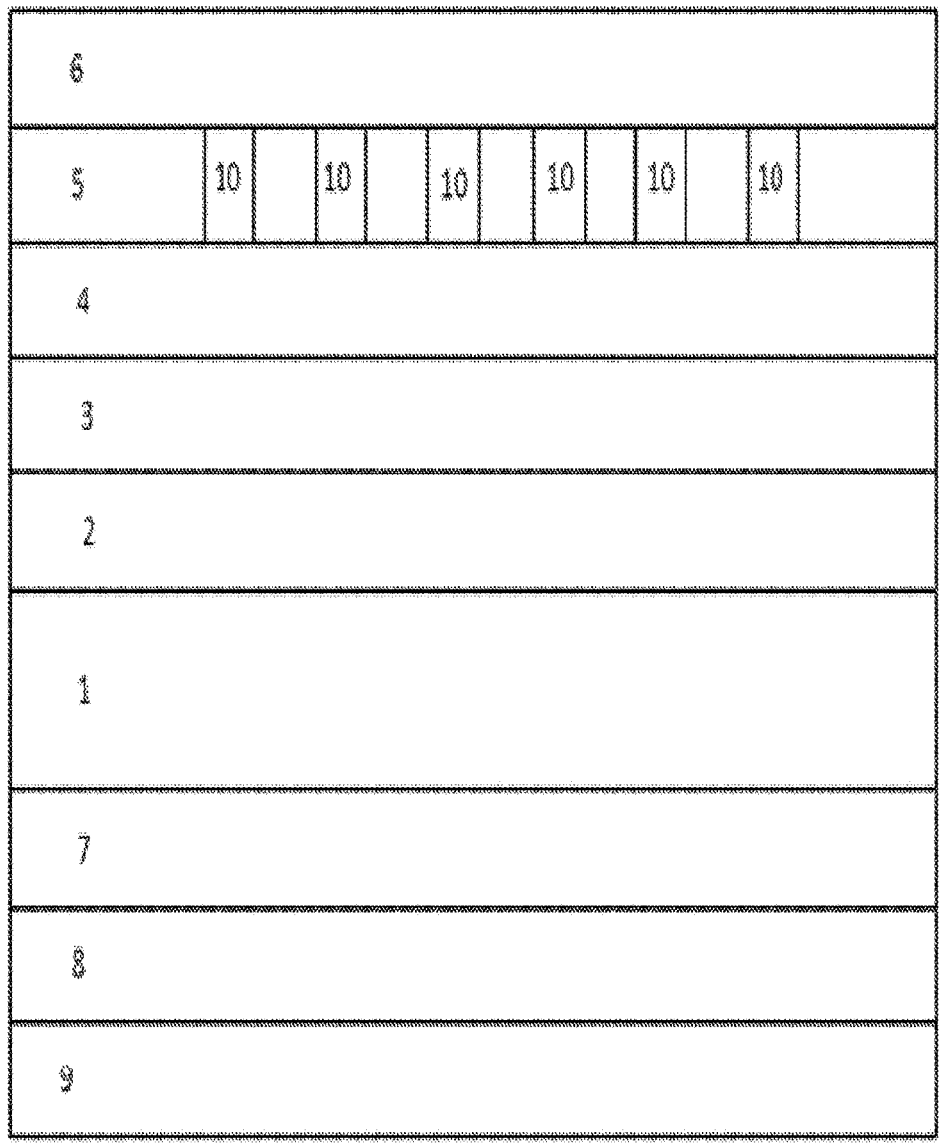
FIG. 4 shows a schematic cross-sectional view of a photonic waveguide including a waveguide core layer between a stack of cladding layers including a transmission grating according to an aspect of the present disclosure.

FIG. 4 shows a schematic cross-sectional view of a photonic waveguide including a waveguide core layer (1) positioned between a stack of cladding layers (2-9) including a transmission grating (10) according to an aspect of the present disclosure. As may be observed from this FIG. 4, the grating (10) is formed within cladding layer 5.

Figure 5:
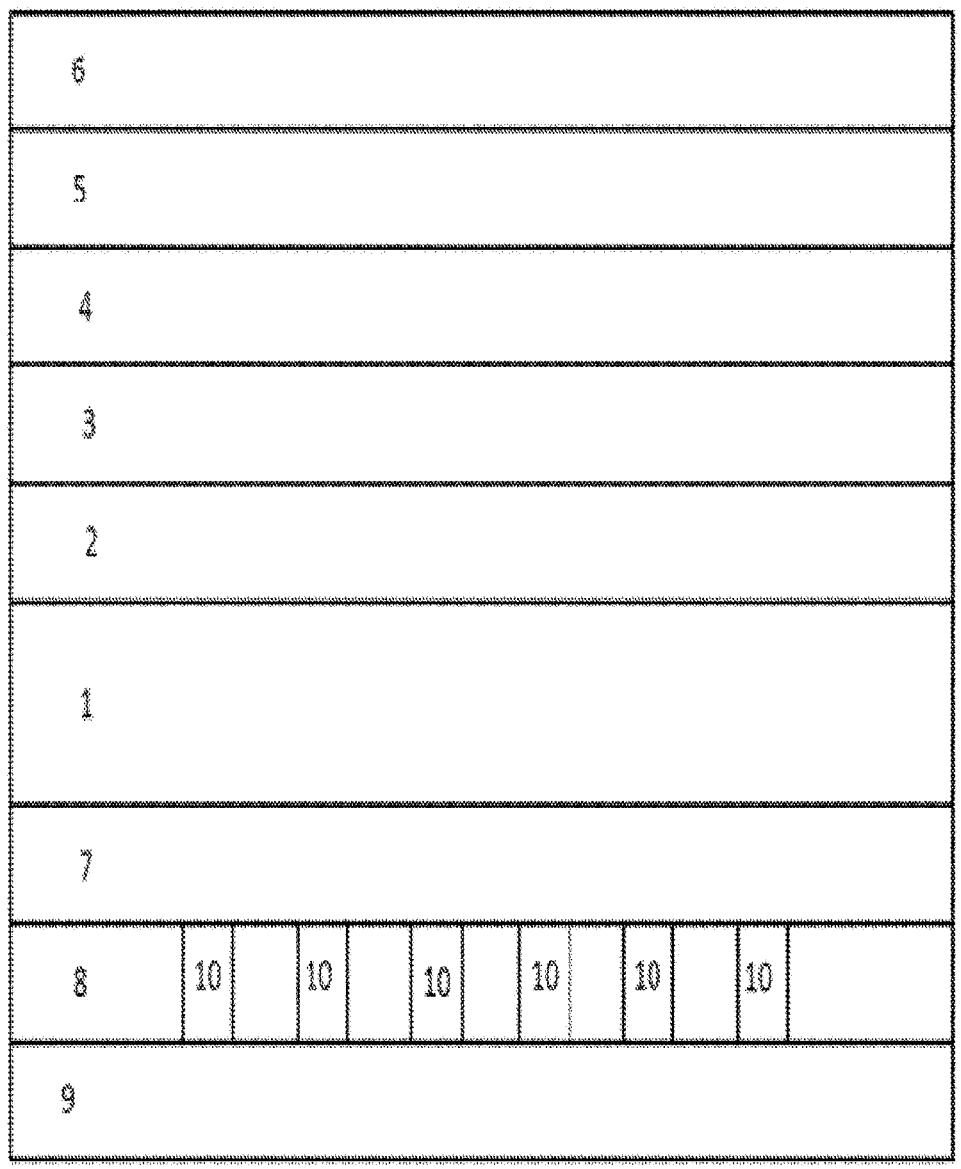
FIG. 5 shows a schematic cross-sectional view of a photonic waveguide including a waveguide core layer between a stack of cladding layers including a transmission grating according to an aspect of the present disclosure.

Up to this point in the discussion, the grating(s) have been depicted "above" the waveguide core in the figures. And while we have not assigned any direction or overlying/underlying relationships to the layers depicted in the figures, for completeness we show now in FIG. 5 a schematic cross-sectional view of a photonic waveguide including a waveguide core layer (1) positioned between a stack of cladding layers (2-) including a transmission grating (10) according to an aspect of the present disclosure. As may be observed from this FIG. 5, the grating (10) is formed within cladding layer 8.

Figure 6:
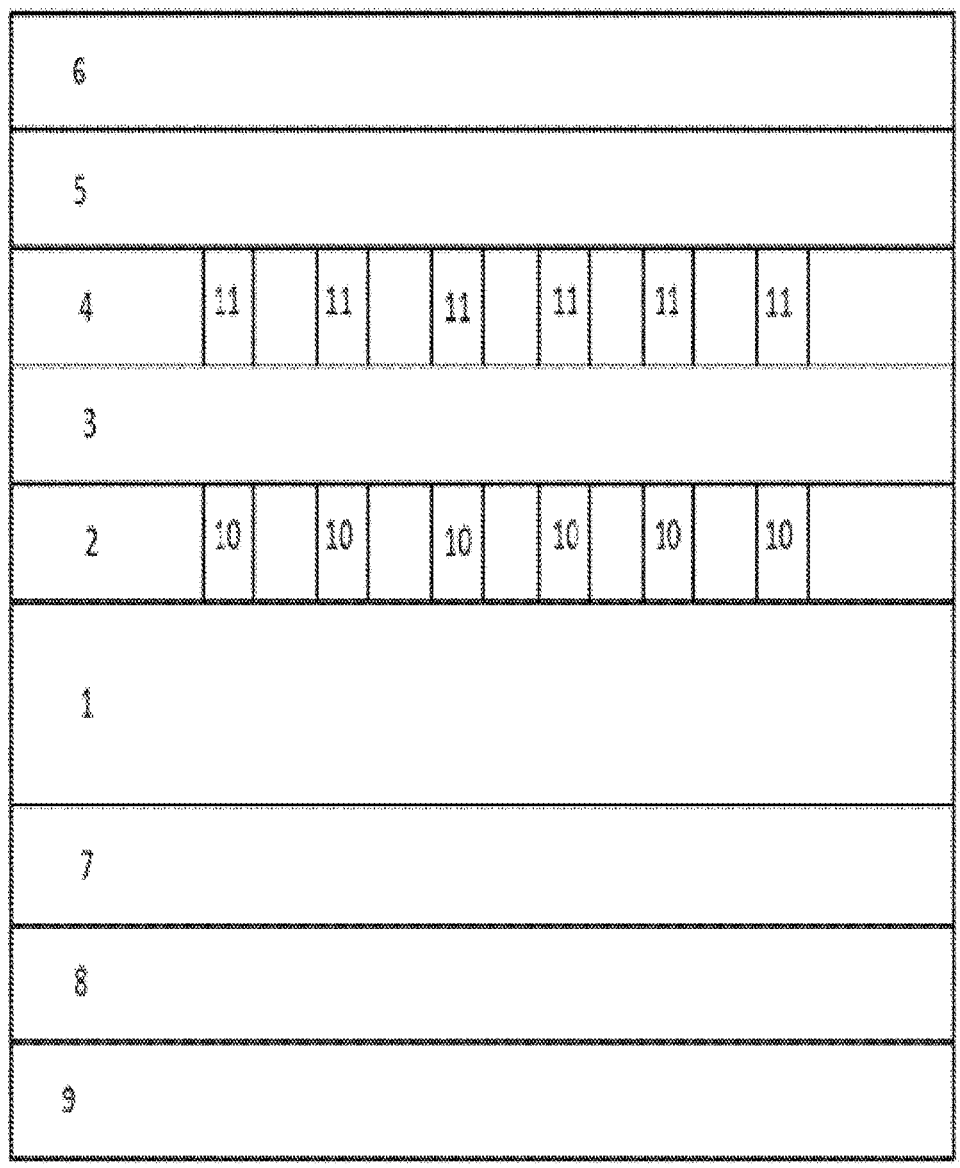
FIG. 6 shows a schematic cross-sectional view of a photonic waveguide including a waveguide core layer between a stack of cladding layers including multiple transmission gratings according to an aspect of the present disclosure.

FIG. 6 shows a schematic cross-sectional view of a photonic waveguide including a waveguide core layer (1) positioned between a stack of cladding layers (2-9) including multiple transmission gratings (10, 11) according to an aspect of the present disclosure. As may be observed from this FIG. 6, the gratings (10, 11) are formed within cladding layers 2 and 4 respectively.

Figure 7:
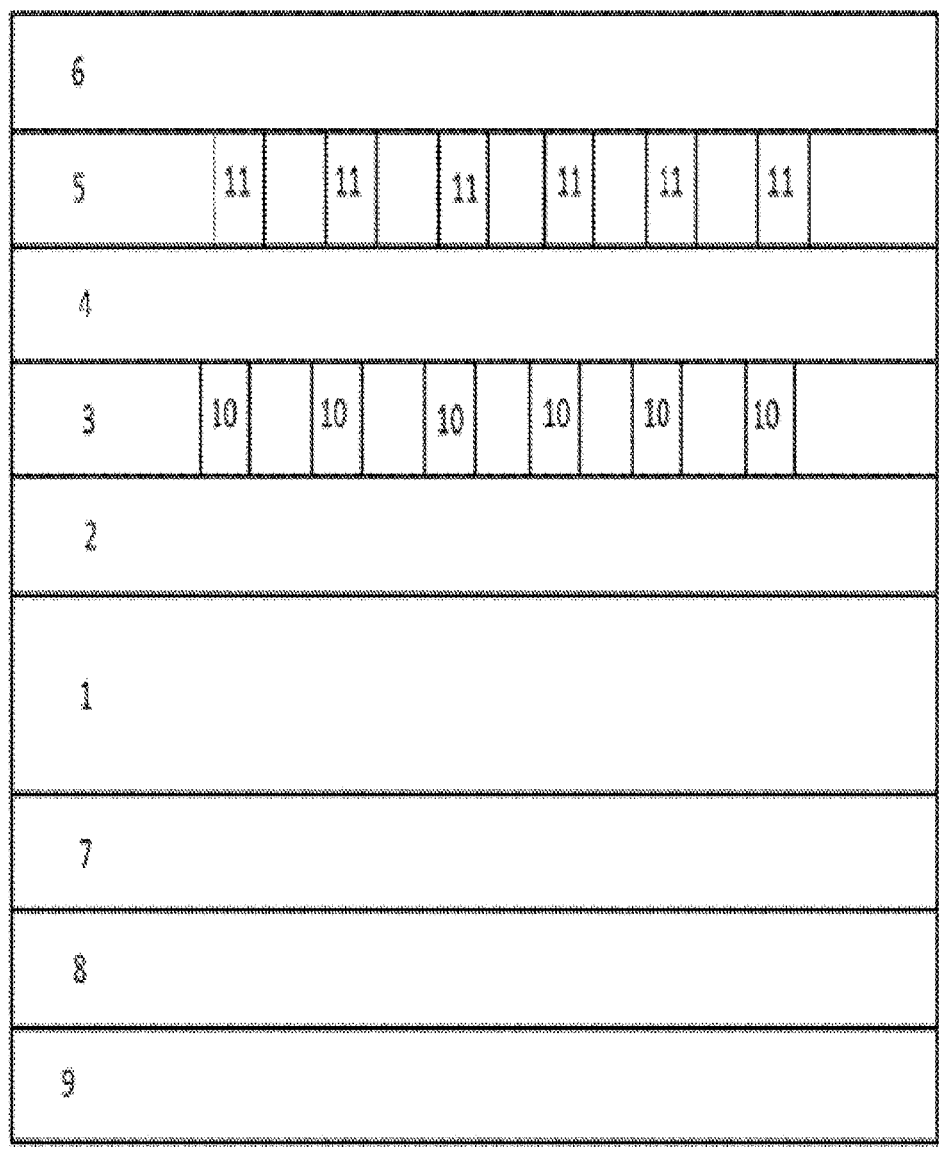
FIG. 7 shows a schematic cross-sectional view of a photonic waveguide including a waveguide core layer between a stack of cladding layers including multiple transmission gratings according to an aspect of the present disclosure.

Similarly, FIG. 7 shows a schematic cross-sectional view of a photonic waveguide including a waveguide core layer (1) positioned between a stack of cladding layers (2-9) including multiple transmission gratings (10, 11) according to an aspect of the present disclosure. As may be observed from this FIG. 6, the gratings (10, 11) are formed within cladding layers 3 and 5 respectively.

Figure 8:
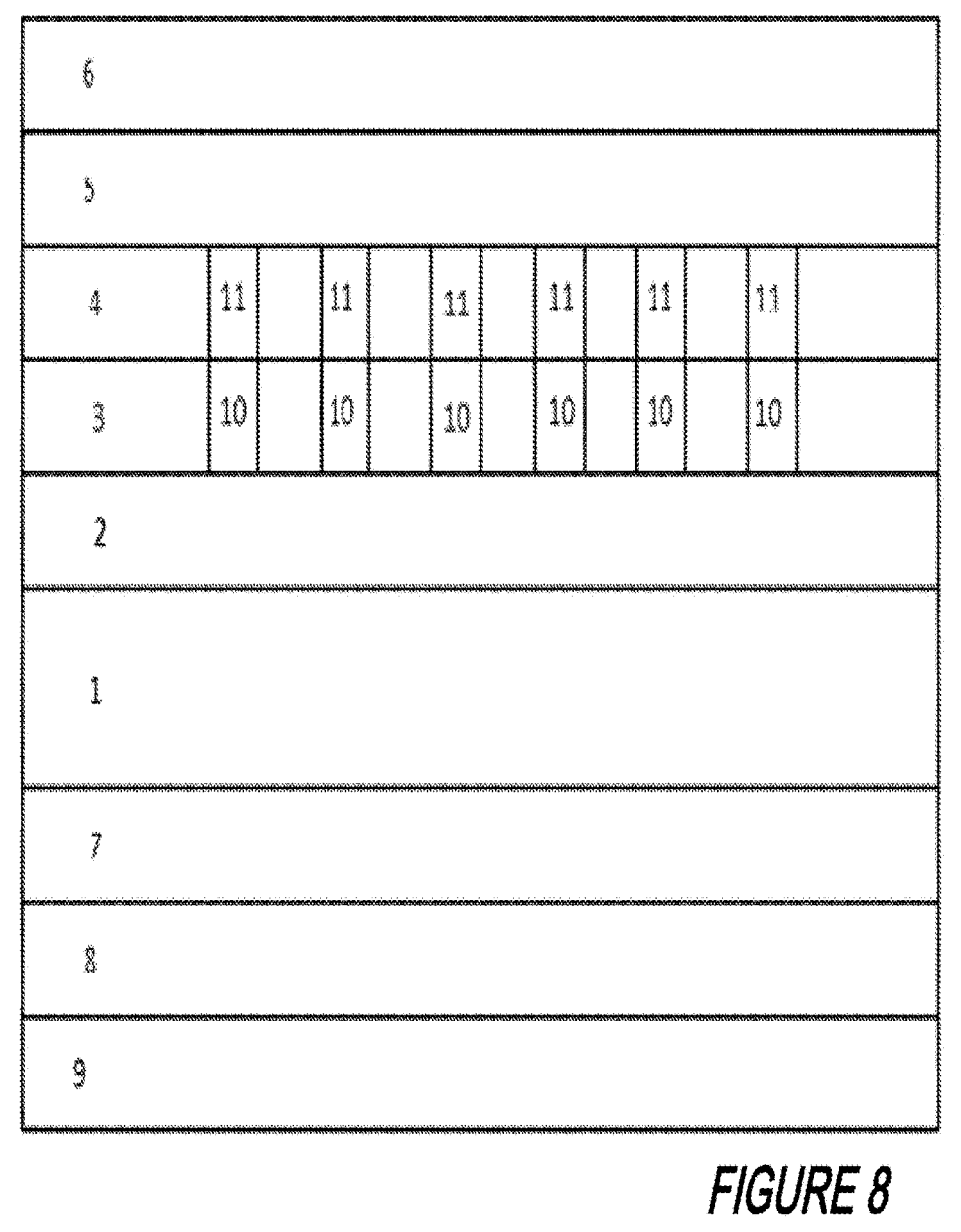

FIG. 8 shows a schematic cross-sectional view of a photonic waveguide including a waveguide core layer (1) positioned between a stack of cladding layers (2-9) including multiple transmission gratings (10-11) according to an aspect of the present disclosure. As may be observed from this FIG. 8, the gratings (10, 11) are formed within adjacent cladding layers 3 and 4 respectively.

Figure 9:
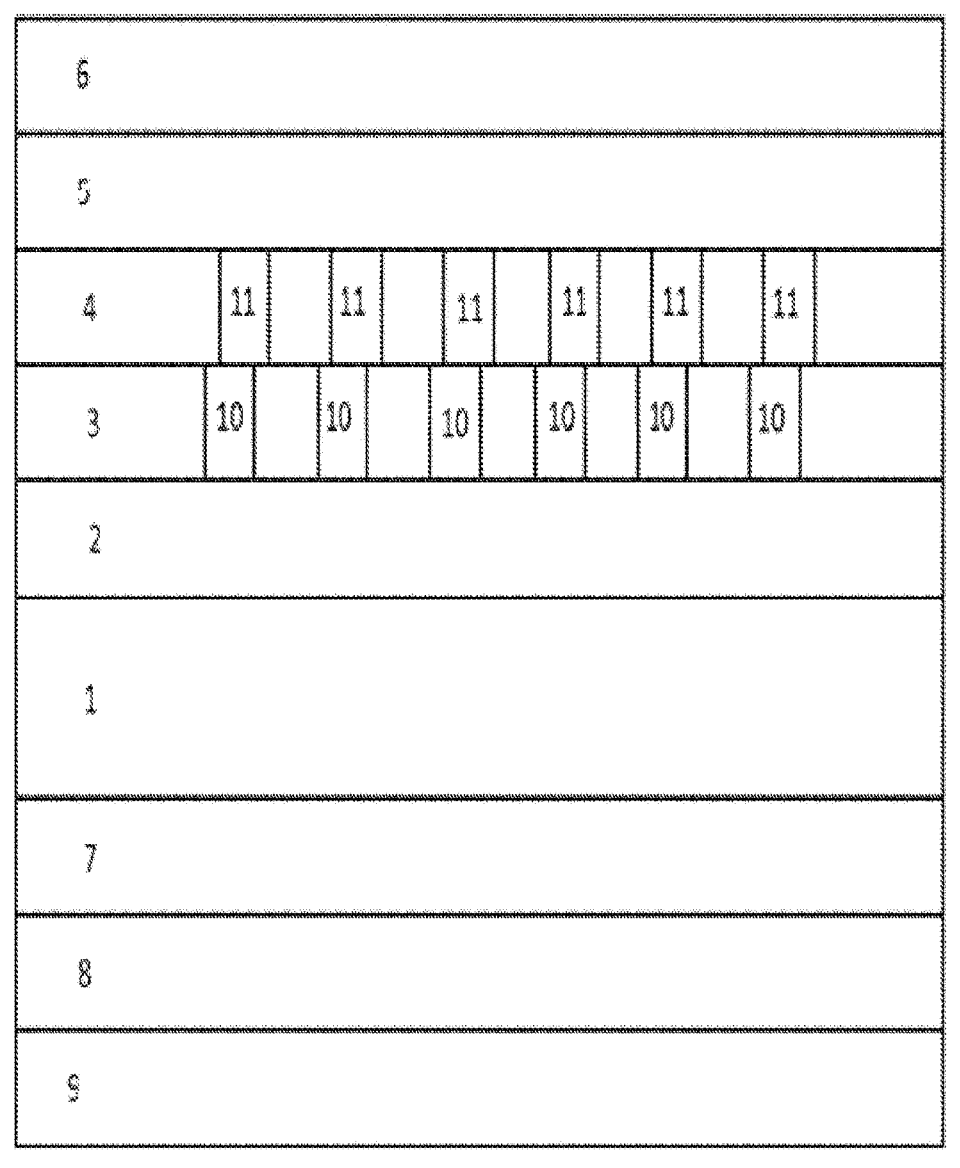

A variation of the configuration depicted in FIG. 8 is shown in FIG. 9 which shows a schematic cross-sectional view of a photonic waveguide including a waveguide core layer (1) positioned between a stack of cladding layers (2-9) including multiple transmission gratings (10, 11) according to an aspect of the present disclosure. As may be observed from this FIG. 9, the gratings (10, 11) are formed within adjacent cladding layers 3 and 4 respectively, and are shifted relative to one another.

One particular embodiment of this invention is a photonic circuit with a transmission grating in a cladding layer and where the optical core stack is locally thinned to control the effective grating strength.

Figure 10:
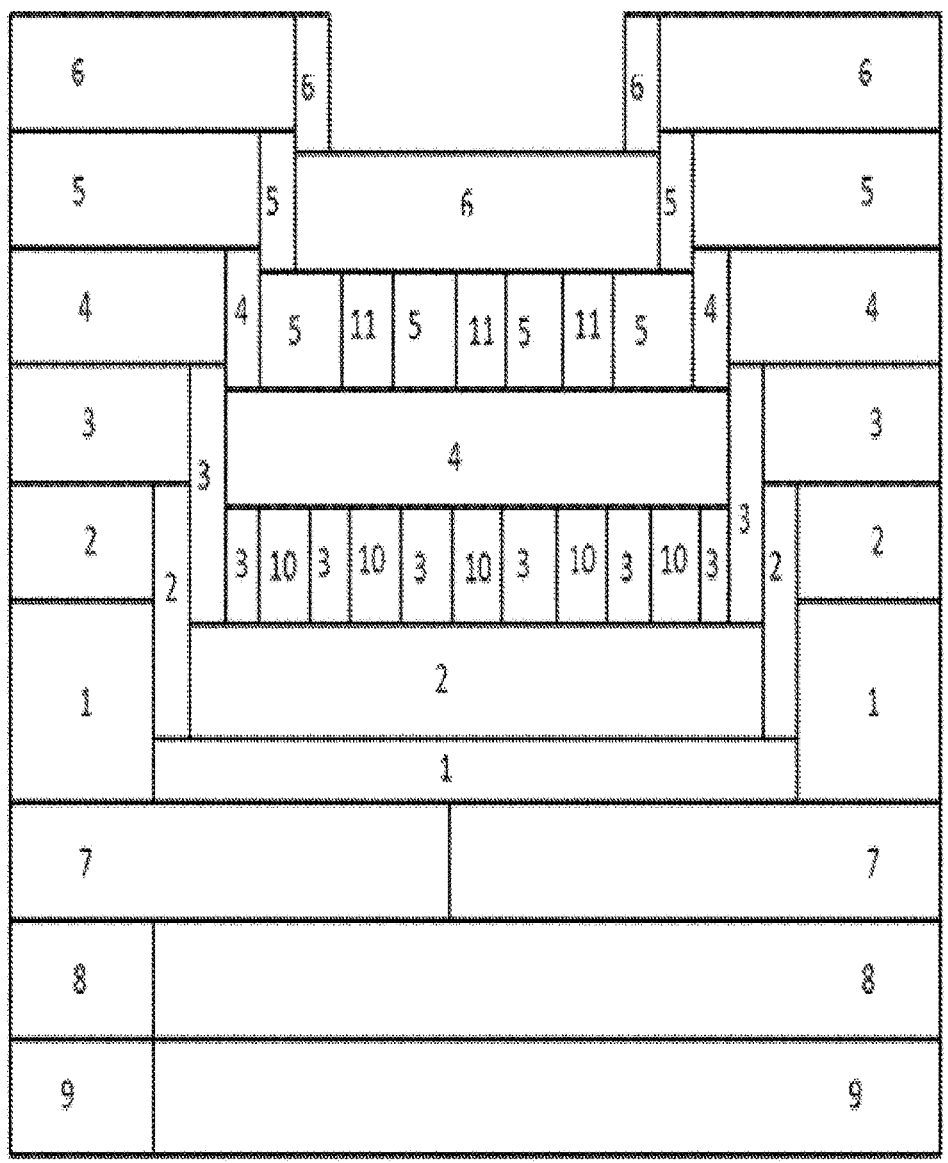
FIG. 10 shows a schematic cross-sectional view of a photonic waveguide including a waveguide core layer between a stack of cladding layers wherein the core layer is locally thinned to control confinement of the optical mode according to an aspect of the present disclosure.

More particularly, FIG. 10 shows a schematic cross-sectional view of a photonic waveguide including a waveguide core layer (1) positioned between a stack of cladding layers (2-9) wherein the core layer (1) is locally thinned to control confinement of the optical mode according to an aspect of the present disclosure. As may be observed from this FIG. 10, the gratings (10, 11) are formed within cladding layers 3 and 5 respectively.

Another particular embodiment according to the present disclosure employs a "cladding grating" such as that disclosed, to prepare a grating coupler where light is coupled—for example-from an optical waveguide to an optical fiber. The grating coupler can be made in a two-dimensional manner such that it may be excited from four sides. As may be appreciated, by exciting the grating from opposite sides and by choosing a certain phase difference, the grating strength and grating reflection can be controlled.

Yet another exemplary embodiment according to the present disclosure is one wherein the cladding grating is positioned on top of a waveguide where light is coupled from a forward propagating mode into a backward propagating mode. One particular benefit of structures constructed according to the present disclosure is that the thickness of the transmission grating may advantageously be changed without affecting the grating strength in a substantial way. Therefore the grating strength and the particular phase shift required can be optimized independently of one another.

Furthermore, more than one grating can be introduced in the cladding layers, wherein the individual gratings have separate functionalities. More particularly, a first grating positioned close to the core stack can serve as a diffraction grating while a second grating further from the core stack serves as a transmission grating. In this manner a single grating can be looked at as two gratings where the structure positioned closest to the waveguide acts as a scattering grating while the top part introduces a phase shift between light scattered at the different grating areas.

Figure 11:
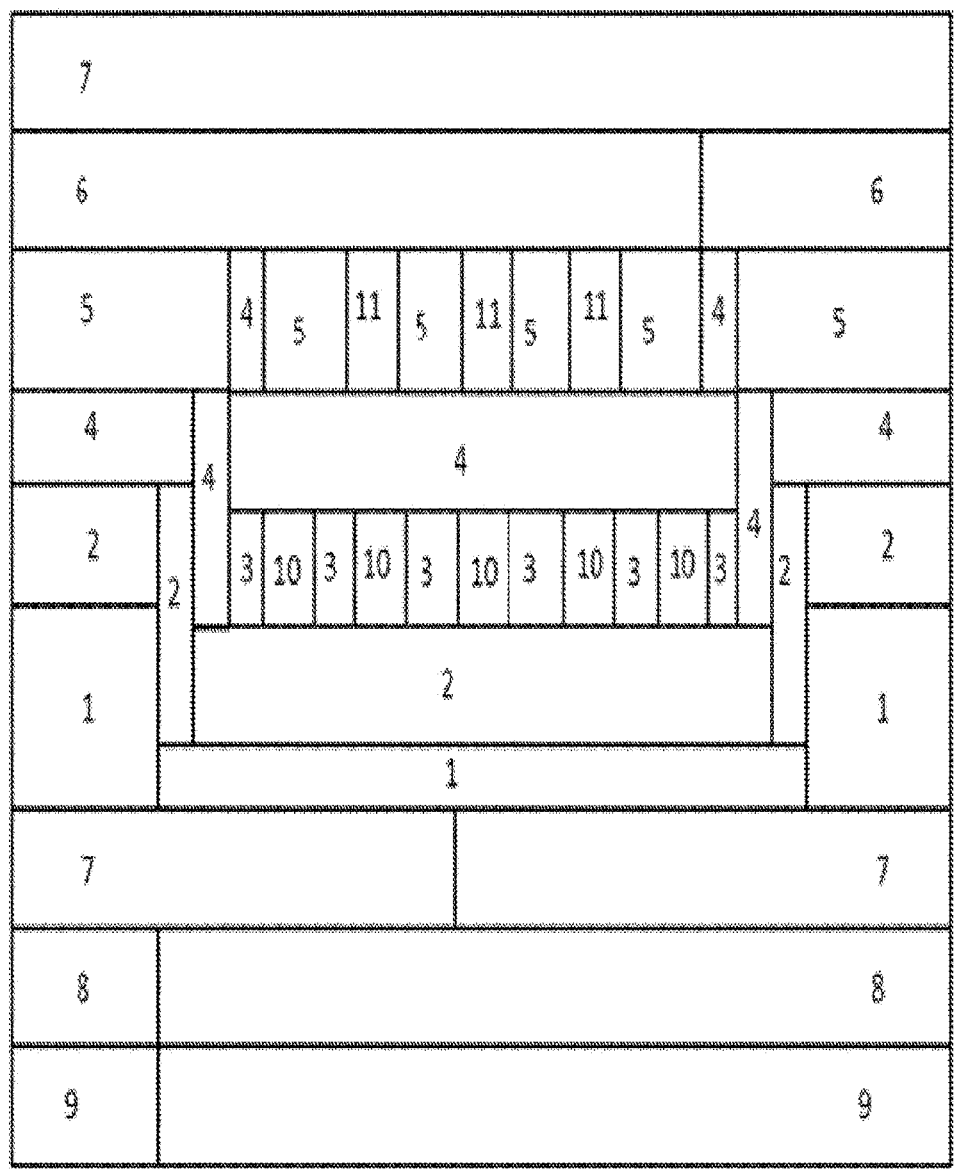
FIG. 11 shows a schematic cross-sectional view of a photonic waveguide including a waveguide core layer between a stack of cladding layers wherein core layer is locally thinned to control the confinement of the optical mode and cladding layers 3 and 5 contain a transmission grating while layers above layer 4 are planar according to an aspect of the present disclosure.

Another exemplary embodiment of a structure according to the present disclosure is depicted in FIG. 11. As may be observed, FIG. 11 shows a schematic cross-sectional view of a photonic waveguide including a waveguide core layer (1) positioned between a stack of cladding layers (2-9) wherein core layer (1) is locally thinned to control the confinement of the optical mode according to an aspect of the present disclosure. As may be further observed from this FIG. 11, the gratings (10, 11) are formed within cladding layers 3 and 5 respectively while layers above layer 4 are planar.

With continued reference to FIG. 11, the exemplary structures shown therein may comprise—a Si substrate layer (layer 8); a buried oxide layer on the order of a micron in thickness (layer 7); a Si core layer of substantially 220 nm thickness (layer 1); a dielectric layer of oxide with a thickness of substantially 40 nm (layer 2); an oxide layer (layer 4); poly-Si structures with a height of around 220 nm in the cladding layers (3 and 5) which form a grating structure and where the mean refractive index is locally smaller than the effective refractive index of the mode.

Figure 12:
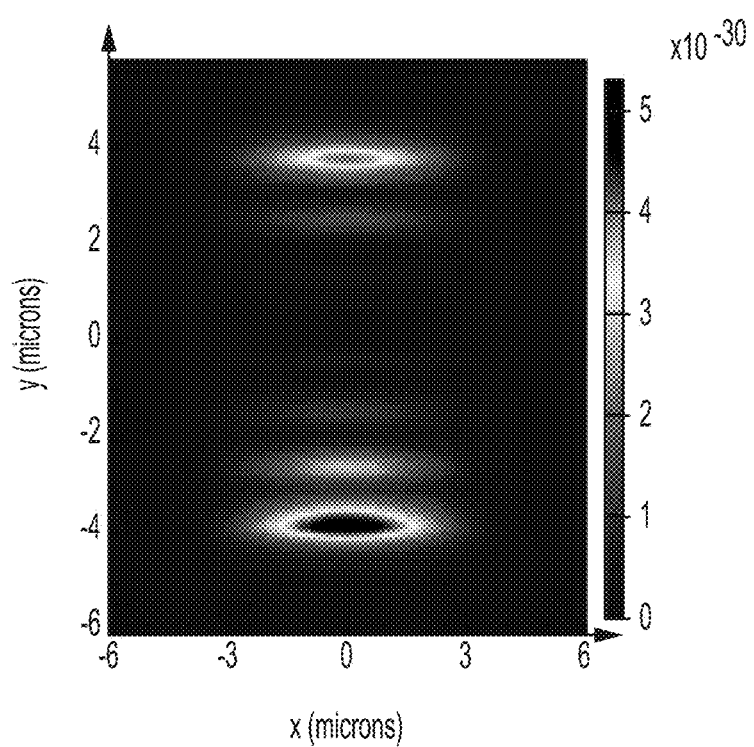
FIG. 12 shows a field intensity plot of grating in the cladding where light is coming from the top and bottom with a pi phase difference according to an aspect of the present disclosure.
Figure 13:
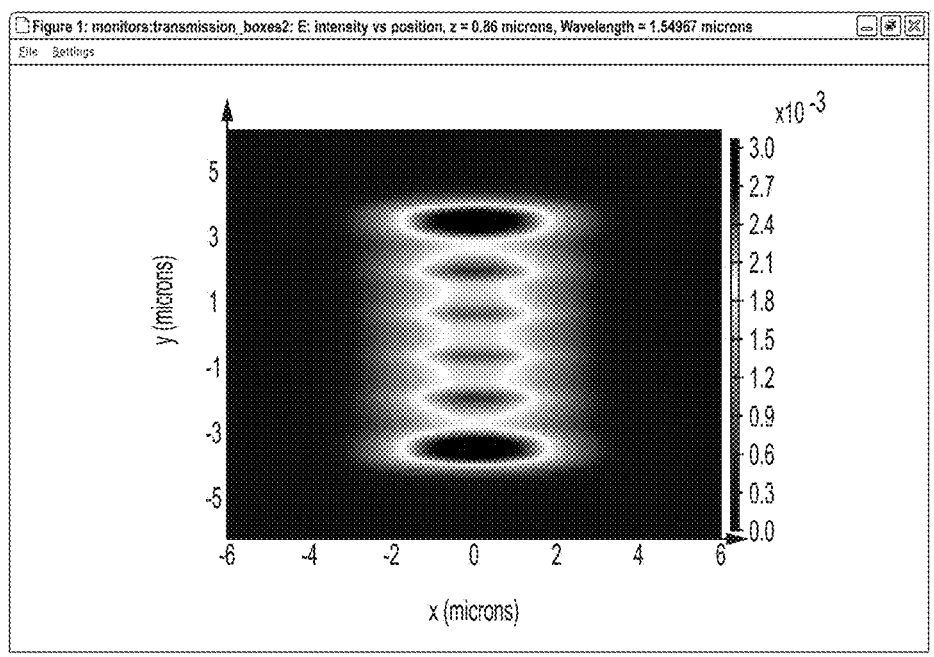
FIG. 13 shows a field intensity plot of grating in the cladding where light is coming from the top and bottom with no phase difference according to an aspect of the present disclosure.

FIG. 12 shows a field intensity plot of grating in the cladding where light is coming from the top and bottom with a pi phase difference according to an aspect of the present disclosure, while FIG. 13 shows a field intensity plot of grating in the cladding where light is coming from the top and bottom with no phase difference according to an aspect of the present disclosure.

Figure 14:
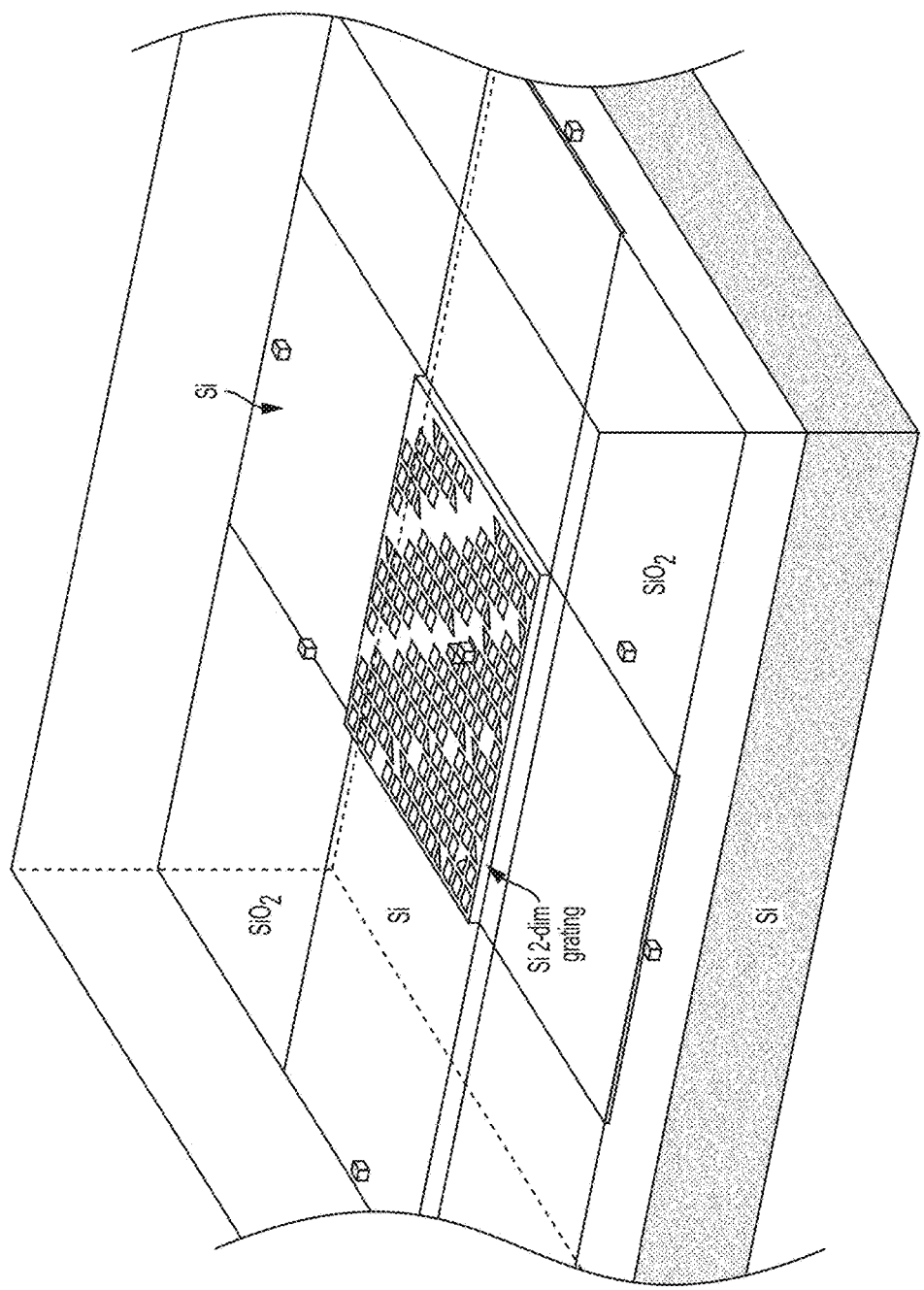
FIG. 14 shows a two dimensional transmission grating defined in the cladding region for vertical coupling to an optical fiber where light is coupled into four waveguides according to an aspect of the present disclosure.
Figure 15:
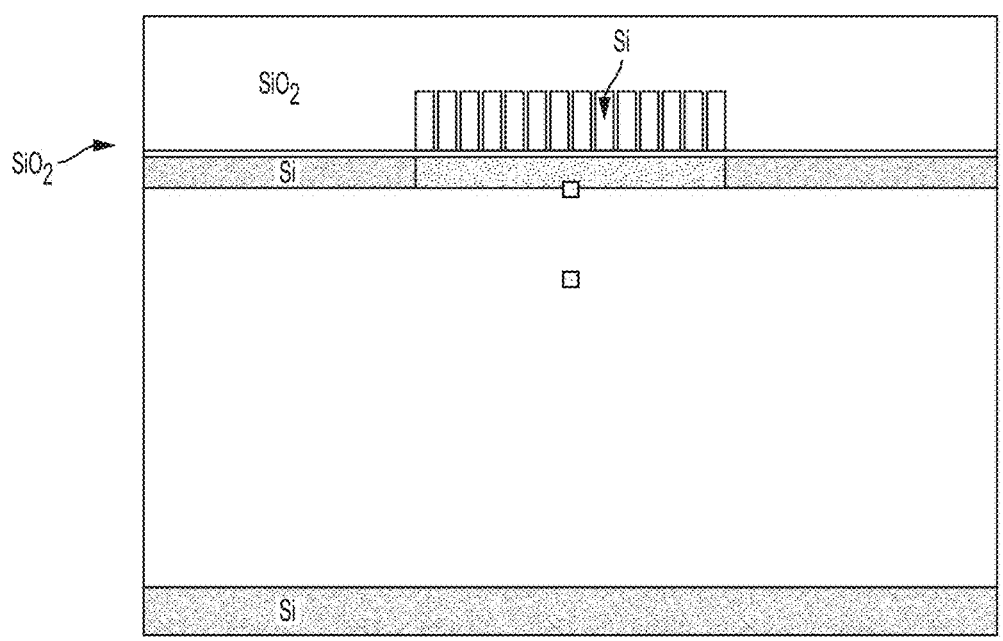
FIG. 15 shows a schematic cross-section of a grating coupler wherein the grating is defined in the cladding layer according to an aspect of the present disclosure.

Examples of 2D structures constructed according to the present disclosure are depicted in FIGS. 14 and 15.

FIG. 14 shows a two dimensional transmission grating defined in the cladding region for vertical coupling to an optical fiber where light is coupled into four waveguides according to an aspect of the present disclosure.

FIG. 15 shows a schematic cross-section of a grating coupler wherein the grating is defined in the cladding layer according to yet another aspect of the present disclosure.

One particular advantage to structures constructed according to the present disclosure is that such structures exhibit a coupling efficiency of 80% to an optical fiber. Of further advantage, such efficiencies may be realized for every polarization state of light so coupled.

Figure 16:
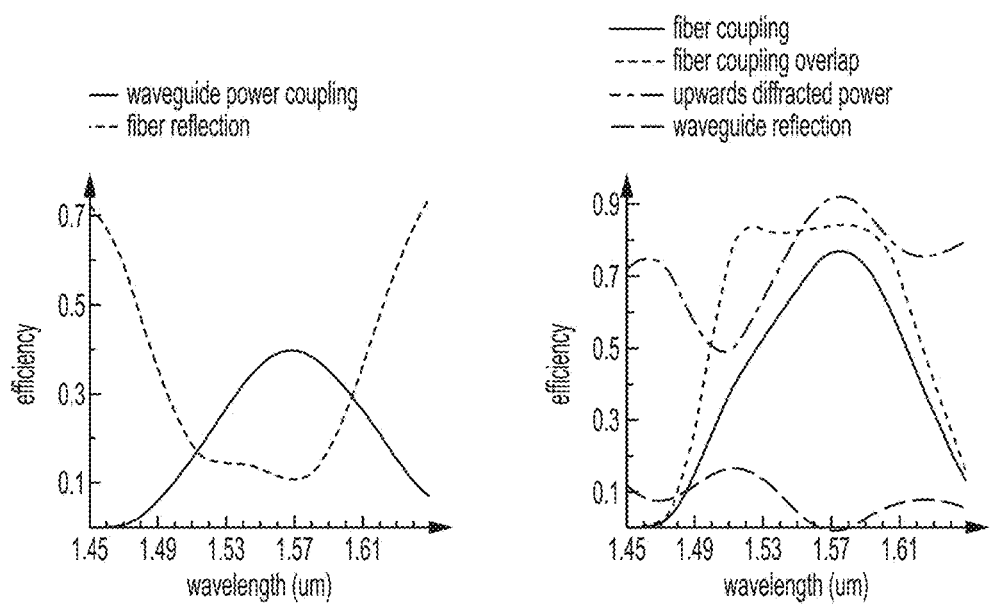
FIG. 16 shows the coupling efficiency of a grating coupler from the optical fiber to one waveguide (left), from two opposite waveguides to the optical fiber (right), according to an aspect of the present disclosure.

FIG. 16 shows two plots exhibiting the coupling efficiency of a grating coupler from the optical fiber to one waveguide (left), from two opposite waveguides to the optical fiber (right), according to an aspect of the present disclosure. As may now be appreciated, such coupling efficiencies are in fact a welcome addition to the art.

At this point, those skilled in the art will appreciate that a number of advantages emerge with respect to structures made according to the present disclosure. In particular, by defining a grating in the cladding layer with a refractive index lower than the effective refractive index of the optical mode, one assures that the mode stays substantially confined in the core layers.

Additionally, by controlling the distance of the layer containing the grating with respect to the stack of core layers, one can control the grating strength or the amount of light per unit length that gets diffracted by the grating.

By controlling the thickness of the core layers locally, one can tune the optical confinement of the mode and thus the grating strength or the amount of light that gets diffracted at the grating in a cladding layer.

Furthermore, by introducing a transmission grating above or under the stack of core layers, the vertical symmetry is broken and by choosing the optimal phase shift, substantially efficient coupling to exactly one first order diffraction can be achieved.

Still further, by thinning down the stack of core layers locally, one can achieve a set of gratings with different grating strength without changing the grating itself. Thereby gratings with different grating strengths at different places on the chip can be achieved.

Additionally, by introducing more than one grating in the cladding layers, the diffraction function of the grating and the phase shift function of the grating can be functionally separated.

By having the grating in the cladding layer, the effective refractive index of the cladding layer containing the grating will have a minimal influence on the effective refractive index of the mode, making the whole structure more robust.

By exciting the grating from opposite sides a standing wave pattern can be formed thereby having influence on the grating strength. By changing the phase difference between the light coming from opposite sides, one can successfully control the grating strength. (see FIGS. 12 and 13).

Finally, by exciting the grating from opposite sides the reflection of the grating can be compensated and minimized, and by choosing an appropriate cladding layer or cladding layers between the cladding layer containing the grating and the core stack, the intermediate cladding layer(s) can be used as an etchstop layer for defining the grating in the cladding layer using a selective etching method. This is particular advantage with respect to timed etch gratings in terms of robustness.

Those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A multi-layer photonic structure, comprising:
   a silicon waveguide core;
   an optical grating adjacent to the silicon waveguide core, the optical grating defined by a plurality of disconnected pillars of a silicon cladding material arranged in a first layer of the multi-layer photonic structure; and
   separators separating the plurality of disconnected pillars of the silicon cladding material,
   wherein the silicon waveguide core has a core region of uniform thickness aligned with the optical grating, the core region being disposed in a second layer of the multi-layer photonic structure that is out of plane from the first layer.

2. The photonic structure of claim 1, further comprising silicon oxide covering the plurality of disconnected pillars of the silicon cladding material.

3. The photonic structure of claim 2, wherein the silicon waveguide core has a non-uniform thickness.

4. The photonic structure of claim 1, wherein the optical grating is a two-dimensional grating.

5. The photonic structure of claim 1, wherein the photonic structure comprises four waveguides intersecting the optical grating, and wherein the silicon waveguide core forms part of at least one of the four waveguides.

6. A photonic structure, comprising:
   a silicon waveguide core;
   an optical grating adjacent to the silicon waveguide core, the optical grating defined by a plurality of disconnected pillars of a silicon cladding material; and
   separators separating the plurality of disconnected pillars of the silicon cladding material, wherein the silicon waveguide core has a core region aligned with the optical grating, the core region having a uniform thickness, wherein the optical grating is spaced apart from the silicon waveguide core such that a strength of the optical grating is determined by optical confinement of a waveguide mode in the silicon waveguide core.

7. The photonic structure of claim 1, wherein the optical grating is a polarization splitting optical grating.

8. The photonic structure of claim 1, wherein the plurality of disconnected pillars are separated from the silicon waveguide core by a layer of silicon oxide.

9. The photonic structure of claim 1, wherein the optical grating exhibits a coupling efficiency to an optical fiber of at least 80% for multiple polarizations.

10. The photonic structure of claim 2, wherein the plurality of disconnected pillars are separated from the silicon waveguide core by a layer of silicon oxide.

11. The photonic structure of claim 3, wherein the plurality of disconnected pillars are separated from the silicon waveguide core by a layer of silicon oxide.

12. The photonic structure of claim 6, further comprising silicon oxide covering the plurality of disconnected pillars of the silicon cladding material.

13. The photonic structure of claim 12, wherein the plurality of disconnected pillars are separated from the silicon waveguide core by a layer of silicon oxide.

14. The photonic structure of claim 12, wherein the silicon waveguide core has a non-uniform thickness.

15. The photonic structure of claim 14, wherein the plurality of disconnected pillars are separated from the silicon waveguide core by a layer of silicon oxide.

16. The photonic structure of claim 6, wherein the optical grating is a two-dimensional grating.

17. The photonic structure of claim 6, wherein the photonic structure comprises four waveguides intersecting the optical grating, and wherein the silicon waveguide core forms part of at least one of the four waveguides.

18. The photonic structure of claim 6, wherein the optical grating is a polarization splitting optical grating.

19. The photonic structure of claim 6, wherein the plurality of disconnected pillars are separated from the silicon waveguide core by a layer of silicon oxide.

20. The photonic structure of claim 6, wherein the optical grating exhibits a coupling efficiency to an optical fiber of 80% for multiple polarizations.

* * * * *